United States Patent Office 3,431,228
Patented Mar. 4, 1969

3,431,228
HOMOGENEOUS COPOLYMERS OF VINYLI-
DENE CHLORIDE AND VINYL CHLORIDE
AND COATINGS THEREFROM
Wallace J. Miles, Rodger J. Lapham, and Harold G.
Hahn, Midland, Mich., assignors to The Dow
Chemical Company, Midland, Mich., a corpora-
tion of Delaware
No Drawing. Filed Jan. 22, 1962, Ser. No. 167,897
U.S. Cl. 260—32.8                3 Claims
Int. Cl. C08f 15/08; C09c 3/74

This invention relates to the coating of regenerated cellulose and other substrates. It more particularly relates to a new and improved lacquer of a vinylidene chloride-vinyl chloride copolymer for coating and its application to regenerated cellulose and the like.

Regenerated cellulose sheet or cellophane and similar substrates often have relatively poor barrier properties with regard to the passage of moisture vapor. Cellophane also is not heat sealable unless coated with a material which itself is heat sealable. Very desirable coatings for cellophanes and the like are achieved by dissolving certain copolymers of vinylidene chloride with other monomers such as acrylonitrile in a suitable solvent, spreading these solutions upon the surface of the cellophane sheet and removing the solvent. The resultant coated cellophane is then heat sealable and has remarkably improved dimensional stability and a greatly reduced rate of moisture vapor transmission through the coated membrane. Unfortunately, such copolymer systems are relatively expensive and often difficult to prepare. The solvents required are usually those comprising a mixture of aromatic hydrocarbon with an aliphatic ketone. Sometimes a cyclic ether such as tetrahydrofuran is employed where low temperatures solutions are employed. The lowest cost practical solvent system for acrylonitrile vinylidene chloride copolymer of the most soluble variety having acceptable physical properties for the coating of cellophane usually comprise about two parts of methyl ethyl ketone to one part of toluene. These solutions are generally only of value when utilized at a temperature of about 55° centigrade or higher. If lower temperature operation is desired, still more expensive solvents must be used, such as tetrahydrofuran and the like materials.

If copolymers having relatively lower percentages of vinylidene chloride are utilized as coatings the barrier properties of the resultant coating are undesirably poor. Lower moisture vapor transmission rates are obtained with copolymers containing relatively high proportions of vinylidene chloride. Also, it is found that as the proportion of monomer polymerized into a copolymer composition containing vinylidene chloride increases, the moisture vapor transmission rates tend to increase. Thus, it is desirable for a regenerated cellulose coating to contain a copolymer having a relatively high percentage of vinylidene chloride combined with a substantially non-polar comonomer.

It is an object of this invention to provide an improved vinylidene chloride copolymer coating of regenerated cellulose articles.

It is another object of this invention to provide a copolymer coating for regenerated cellulose which is a copolymer of vinylidene chloride and vinyl chloride.

It is still a further object of this invention to provide vinylidene chloride-vinyl chloride copolymer solutions in low cost solvents.

It is a further object of this invention to provide a crystalline copolymer coating for regenerated cellulose.

These benefits and other advantages are achieved in accordance with the invention by providing a solution of a substantially uniform copolymer comprising about 14 to about 19 percent vinyl chloride and about 86 to about 81 percent vinylidene chloride in a solvent comprising about 55 to about 20 percent of a ketone selected from the group consisting of methyl ethyl ketone, acetone, methylisobutyl ketone and mixtures thereof, and from about 45 to about 80 percent of an aromatic solvent selected from the group consisting of toluene, xylene, benzene, chlorobenzene, and mixtures thereof.

The copolymer composition range as defined above does not necessarily refer to the composition of a monomer mixture employed in the preparation of the copolymer. Nor does it necessarily refer to any copolymer whose elemental analysis indicates the desired composition range. The copolymer employed in the practice of the present invention is a substantially homogeneous copolymer wherein the polymer molecules have substantially uniformly copolymerized therein vinyl chloride in the proportion of 14 to 19 percent and vinylidene chloride in the proportion of 86 to 81 percent. Homogeneous copolymers generally are known in the art, and are prepared by a variety of methods. One method by which the vinyl chloride-vinylidene chloride copolymers of the present invention are prepared is by the polymerization of a mixture of about 45 percent vinyl chloride and 55 percent vinylidene chloride to a polymer conversion of about 10 percent. The resultant copolymer obtained contains about 16 percent polymerized vinyl chloride and the remainder of the polymer is vinylidene chloride. The reactivity or tendency to polymerize of the vinyl chloride is different from that of the vinylidene chloride; the vinyl chloride adds to the copolymer chain at a slower rate than does the vinylidene chloride. Thus, the initial monomer compositions are adjusted accordingly in order that the initial copolymer formed has a desired composition. Similar copolymers or homogeneous copolymers, sometimes called "homocopolymers" are prepared readily by emulsion polymerization by the continuous or continual addition of a monomer mixture at a predetermined rate.

The lacquer or coating mixtures in accordance with the invention are readily prepared by dissolving the solid vinylidene chloride-vinyl chloride copolymer in the solvent mixture by any of the conventional means such as agitating a suspension of the polymer in the solvent at room temperature, by heating in combination with agitation and the like. Advantageously, in cases where time is not a significant factor, the solvent and copolymer are placed in the same vessel and allowed to stand until complete solution has taken place. To expedite solution it is sometimes beneficial to wet the resin granules with the aromatic portion of solvent composition for a period of time before adding the ketone component. This procedure alleviates the "surface gellation" phenomenon which sometimes is characteristic of slow solution.

The concentration of the copolymer in the solvent medium will vary with the particular coating method employed and the characteristics of the specific copolymer utilized. Desirably the copolymer will comprise about 10 to 20 percent by weight of the total lacquer mixture although higher or lower concentrations are utilized if advantageous.

The lacquer comprising the vinyl-vinylidene copolymers in accordance with the invention and suitable solvent system are readily applied to shaped articles, such as cellophane, by conventional means such as spraying, brushing, dipping, rolling, and the like. Generally it is advantageous to apply a lacquer having a temperature of about from 20 to 40° centigrade.

The solvent systems employed in the practice of the present invention generally are comprised of two components. One, a ketone selected from the group of methyl ethyl ketone, acetone, and methylisobutyl ketone and mixtures thereof. The ketone component of the solvent mixture should comprise about 50 to about 20 percent by weight of the total solvent mixture. The second component is an aromatic solvent comprising about 50 to about 80 percent by weight of the total solvent mixture, the solvent being selected from the group consisting of toluene, xylene, benzene, chlorobenzene, and mixtures thereof. Frequently trace amounts of other solvents are advantageously incorporated in the mixture, such as up to about 1 or 2 percent tetrahydrofuran when lacquers of maximum clarity are required.

Usually, it is advantageous and beneficial to apply to cellophane, particularly that employed for most wrapping and packaging purposes, a coating of the copolymer composition about 1/10 mil in thickness in order to obtain adequate barrier properties. Frequently, lesser amounts are quite satisfactory for some applications where the barrier properties of the vinyl chloride-vinylidene chloride copolymer are not required. Beneficially, when maximum protection of the contents of such a packaging is desired, coating thicknesses in excess of 0.1 mil are readily utilized. These may be applied by depositing a heavy coat of the coating lacquer comprising the solvent and copolymer and subsequently drying or the coating may be applied by means of successive thinner coats of a lacquer. When applied to the cellophane, generally it is advantageous to remove the solvent by heating the substrate and coating to a temperature in excess of the boiling point of the solvent. However, lacquers in accordance with the present invention applied to cellophane may be permitted to dry at room temperature or even lower and provide an excellent coating. The drying temperature is primarily a factor of cost, inventory, and operating convenience. However, beneficially the solvent is removed within a temperature range of from about 100° C. to about 150° C.

The polymers in accordance with the invention have the unique characteristics of being crystalline when deposited from the solvent system. Crystalline vinylidine chloride polymers exhibit higher barrier characteristics than do those of equivalent compositions when deposited in such a manner that the coating is non-crystalline, crystallinity of the coating being determined on a relative basis by the measurement of the infrared absorption at various wave lengths. A particularly beneficial and advantageous measurement is made by comparing the absorption intensity minimum at a wave length of about 955 millimicrons to that at about 930 millimicrons. The absorption at about 955 divided by the absorption at about 930 gives a ratio which is indicative of the crystalline nature of the copolymer. This ratio numerically does not vary widely from highly crystalline to substantially non-crystalline, but serves as an adequate indication for most purposes. Thus, if the ratio is between 0.7 to 0.8 a polymer would be substantially amorphous, whereas, if the ratio were as high as 1.10, the polymer would be very highly crystalline. In vinylidene chloride-vinyl chloride copolymers of a given copolymer composition, the barrier properties are vastly improved by a relatively small change in the crystallinity. For example, a change of 0.07 in the absorption ratios heretofore mentioned could represent a change of up to 50 percent in the moisture vapor transmission properties of the coating.

By way of further illustration, a mixture of 55 parts by weight of vinylidene chloride and 45 parts by weight of vinyl chloride were polymerized in the presence of 0.1 percent by weight based on the monomer mixture of azoisobutylnitrile at a temperature of 65° centigrade until about 10 percent of the monomer mixture was converted to polymer. The unpolymerized components of the system were decanted and evaporated at room temperature. The copolymer comprising about 17 percent copolymerized vinyl chloride obtained from the evaporation was dissolved in a mixture of two parts of toluene to one part of methyl ethyl ketone at about 35° centigrade. The resultant lacquer contained 10 percent by weight of the copolymer. The lacquer was aged at a temperature of about 25° centigrade for a period of one day. A coating of the lacquer was cast onto a sheet of regenerated cellulose and the coating dried at a temperature of 250° Fahrenheit for five minutes. The dry coating had a thickness of about 0.1 mil. Examination by infrared means as hereinbefore described indicated a crystallinity ratio of 1.05. Measurements of moisture vapor transmission rate indicated an average value of 0.20 gram per 100 square inches per 24 hours as determined by the method outlined in TAPPI T–464 m–45 in a constant humidity cabinet at 100° Fahrenheit and 90 to 95 percent relative humidity. A portion of the Saran coating was heated at a rate of about 4° per minute and the melting of the crystalline polymer coating as followed by infrared absorption at 955 millimicrons was complete at 140° centigrade.

By way of comparison, the conventional regenerated cellulose coating comprising a copolymer containing 9 percent acrylonitrile, 91 percent vinylidene chloride was coated to an identical thickness on a similar piece of cellophane. The crystallinity of the acrylonitrile copolymer was indicated to be 1.05. The moisture vapor transmission rate was 0.2 gram per 100 square inches per 24 hours, the temperature at which crystal melting is complete was 150° centigrade. This coating was deposited from a hot 2:1 mixture of methyl ethyl ketone and toluene and dried at 250° Fahrenheit for a period of 5 minutes. A portion of the same acrylonitrile copolymer sample was dissolved in tetrahydrofuran and deposited in a like thickness on a similar piece of cellophane. The crystallinity ratio was 0.98. The moisture vapor transmission rate was 0.30 gram per 100 square inches per 24 hours and the temperature at which crystal melting was complete was 150° centigrade.

The high crystallinity of the copolymer coating in accordance with the invention provides barrier properties comparable with commercially used cellophane coatings and presents the further advantage of having a crystalline melting temperature of 10° centigrade less. The crystalline melting temperature results in a more readily heat sealable composition which is less liable to thermal decomposition during the sealing process than are the higher melting materials.

Similar commensurate and beneficial results were obtained when a 20 gallon reaction vessel was charged with 90 pounds of water containing 540 grams of a sodium sulphosuccinate sold under the trade name of Aerosol MA and 286 grams of potassium persulfate employed as a catalyst. The aqueous solution was heated to a temperature of 50° centigrade with agitation. While maintaining agitation, 2.0 pounds of a mixture containing 60 percent by weight of vinyl chloride and 40 percent by weight of vinylidene chloride were added. Initiation of polymerization was indicated by an increase in the internal pressure within the reactor. Eighty eight pounds of a mixture of 16 percent by weight of vinyl chloride and 84 percent by weight of vinylidene chloride with 1½ parts of acrylic acid per hundred parts of the vinyl chloride-vinylidene chloride mixture were added at a rate of about 7 pounds per hour at a rate to maintain an internal reactor pressure about 34 pounds per square inch gauge. When the monomer addition was complete, the reactor was vented and cooled to about 25° centigrade. A stable aqueous dispersion of about 50 percent polymer solids was obtained. One part of the latex was added to two parts of a 0.4 percent by weight aluminum sulphate solution to cause coagulation of the latex. The coagulum was filtered and dried at a temperature of 50° centigrade for about 24 hours. A lacquer mixture was prepared from this polymer by dissolving 10 parts of polymer by weight in 90 parts of a mixture comprising 60 parts of toluene and 30 parts of methyl ethyl ketone at a temperature of 35° centigrade. The resultant clear lacquer was urged at a temperature of about 24° centigrade for a period of 24 hours. The lacquer was applied to a regenerated cellulose substrate as a coating having about 0.1 mil in thickness (dry) and dried at a temperature of 250° Fahrenheit for 5 minutes. The crystallinity ratio of the resultant coating was 1.03. The moisture vapor transmission rate was 0.22 gram per 100 square inches per 24 hours and the temperature at which crystal melting was complete was about 140° centigrade. Commensurate results were obtained when the polymer was dissolved in a mixture comprising three parts acetone and one part of xylene and coated with cellophane substrate. Lacquer prepared from the previously described polymer in mixtures of one part methylisobutyl ketone to four parts of benzene, one part of acetone to three parts chlorobenzene, one part of methyl ethyl ketone and one part of xylene were found to give results commensurate with and beneficial as those heerinbefore set forth.

Beneficially, increased adhesion may be obtained with copolymers in accordance with the present invention if a third monomer constituent is utilized such as a copolymerizable organic acid such as acrylic acid, methacrylic acid, and the like. Such acids may be incorporated in copolymer compositions in a proportion of from about 0.5 to about 4 percent of the total weight of the copolymer. Advantageously, such acidic components are incorporated at a level of from about 0.5 to 1.5 percent by weight of the copolymer composition.

Commensurate results are attained when substantially homogenous copolymers containing from about 14 to about 19 percent of vinyl chloride and from about 86 percent to about 81 percent vinylidene chloride are utilized with the hereinbefore described solvent systems.

The utility of the coating compositions is not restricted to the coating of cellophane. The coating compositions may be employed in the coating of other materials, for example, fibrous cellulosic materials such as tissue paper, book papers, crepe paper, wrapping paper, cardboard, chipboard, wallboard and the like; other films such as polyethylene terephthalate, hydroxyethyl cellulose, polyethylene, methyl or ethyl cellulose, polypropylene; wood and wood products such as plywood; textiles such as cotton textiles and fabrics, rayon textiles and fabrics, other vegetable fiber products and the like. For example, the coating compositions may be utilized in coating wooden vats, paper cartons such as milk cartons, wrapping papers for food products, cotton duck for use in awnings, umbrellas and the like. On the other hand, the solvent system of this invention can also be used to cast unsupported films of the vinylidene chloride copolymers disclosed herein.

As is apparent from the foregoing specification, the apparatus and method of the present invention are susceptible of being embodied with various alternations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A solution of a crystallizable copolymer,
   said copolymer being substantially homogeneous chemical composition and comprising about 14 to about 19 percent vinyl chloride and about 86 to about 81 percent vinylidene chloride in a
   solvent comprising about 55 to about 20 percent of ketone selected from the group consisting of methyl ethyl ketone, acetone, methyl ethyl isobutyl ketone and mixtures thereof, and about 45 to 80 percent of an aromatic solvent selected from the group consisting of toluene, xylene, benzene, chlorobenzene, and mixtures thereof.

2. The solution of claim 1, wherein the concentration of copolymer is from about 10 to about 20 percent by weight of the total mixture.

3. The solution of claim 1, wherein said solvent comprises about 55 to about 20 percent of methyl ethyl ketone and from about 45 to about 80 percent toluene.

References Cited
UNITED STATES PATENTS

| 3,039,986 | 6/1962 | Blood et al. | 260—32.8 |
| 3,073,718 | 1/1963 | Lund | 260—32.8 |
| 3,005,728 | 10/1961 | Bridgeford | 117—145 |

MORRIS LIEBMAN, *Primary Examiner.*

L. T. JACOBS, *Assistant Examiner.*

U.S. Cl. X.R.

260—33.6, 33.8